United States Patent
Haas (10) Patent No.: US 10,730,704 B2
(45) Date of Patent: Aug. 4, 2020

(54) ROBOTIC TRANSPORT DEVICE FOR TRANSPORTING SMALL COMPONENTS AND METHOD CARRIED OUT BY THE ROBOTIC DEVICE

(71) Applicant: BECKHOFF AUTOMATION GMBH, Verl (DE)

(72) Inventor: Melvin Haas, La Croix (CH)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 16/385,716

(22) Filed: Apr. 16, 2019

(65) Prior Publication Data

US 2019/0241374 A1 Aug. 8, 2019

Related U.S. Application Data

(63) Continuation of application No. PCT/EP2017/076724, filed on Oct. 19, 2017.

(30) Foreign Application Priority Data

Oct. 19, 2016 (DE) .................. 10 2016 119 894

(51) Int. Cl.
  *B65G 47/84* (2006.01)
  *B65G 21/12* (2006.01)
  *B65G 47/14* (2006.01)
  *B65G 47/86* (2006.01)
  *B25J 9/02* (2006.01)

(52) U.S. Cl.
  CPC ............ *B65G 47/843* (2013.01); *B25J 9/026* (2013.01); *B65G 21/12* (2013.01); *B65G 47/1478* (2013.01); *B65G 47/842* (2013.01)

(58) Field of Classification Search
  CPC ......... B65G 1/06; B65G 25/04; B65G 15/12; B65G 27/005; B65G 47/68; B65G 47/60; B65G 47/61; B65G 47/84; B65G 21/12; B65G 47/842; B65G 47/1478; B65G 47/843; B25J 9/026
  USPC ............ 198/429, 430, 431, 443, 444, 465.4; 414/222.08, 591, 594, 226.02, 226.01, 414/222.11, 222.12; 901/14
  See application file for complete search history.

(56) References Cited

U.S. PATENT DOCUMENTS

| | | | |
|---|---|---|---|
| 2,416,352 A | 8/1944 | Seward | |
| 4,343,590 A * | 8/1982 | D'Aloisio | B65G 47/907 294/106 |
| 6,056,108 A | 5/2000 | Buchi et al. | |
| 6,688,451 B2 | 2/2004 | Derby et al. | |

(Continued)

FOREIGN PATENT DOCUMENTS

| | | |
|---|---|---|
| DE | 3422150 A1 | 12/1985 |
| DE | 29612787 U1 | 1/1998 |

(Continued)

*Primary Examiner* — James R Bidwell
(74) *Attorney, Agent, or Firm* — Dorsey & Whitney LLP (57) ABSTRACT

A robotic transport device for small components comprising transport mechanism being suspended at two suspension elements, wherein the two suspension elements are distanced from each other in the direction of transport and wherein the two suspension elements are constructed in such a way that each of them is, independently from each other, be shifted in a direction vertical or substantially vertical to the direction of transport.

20 Claims, 5 Drawing Sheets

(56) References Cited

U.S. PATENT DOCUMENTS

| | | | |
|---|---|---|---|
| 7,712,598 B1 | 5/2010 | Derby | |
| 8,776,984 B2* | 7/2014 | Monti | B65B 35/38 |
| | | | 198/432 |
| 8,973,768 B1 | 3/2015 | Jung et al. | |
| 10,029,865 B1* | 7/2018 | McCalib, Jr. | B65G 1/06 |
| 2006/0182545 A1* | 8/2006 | Ray | B65G 57/03 |
| | | | 414/226.01 |
| 2007/0031217 A1 | 2/2007 | Sharma | |
| 2010/0047051 A1* | 2/2010 | Knobel | B25J 9/1065 |
| | | | 414/751.1 |
| 2010/0307278 A1* | 12/2010 | Mignano | B25J 5/04 |
| | | | 74/490.03 |
| 2012/0118701 A1* | 5/2012 | Duchemin | B65G 47/088 |
| | | | 198/429 |
| 2015/0071740 A1* | 3/2015 | Fujii | B21D 43/05 |
| | | | 414/222.08 |
| 2015/0375351 A1* | 12/2015 | Maeda | G01N 35/04 |
| | | | 414/728 |

FOREIGN PATENT DOCUMENTS

| | | |
|---|---|---|
| DE | 102009014553 A1 | 10/2009 |
| EP | 0916457 A2 | 9/1998 |
| EP | 2279971 A1 | 6/2010 |
| EP | 2982622 A1 | 7/2015 |

* cited by examiner

ROBOTIC TRANSPORT DEVICE FOR TRANSPORTING SMALL COMPONENTS AND METHOD CARRIED OUT BY THE ROBOTIC DEVICE

CROSS-REFERENCE TO RELATED APPLICATION

This application is a continuation of PCT Application No. PCT/EP2017/076724, filed Oct. 19, 2017, which claims priority to German Patent Application No. 10 2016 119 894.3, filed Oct. 19, 2016 and entitled ROBOTISCHE TRANSPORTVORRICHTUNG ZUM TRANSPORTIEREN VON KLEINTEILEN UND MIT DER ROBOTISCHEN VORRICHTUNG DURCHFÜHRBARES VERFAHREN, each of which are incorporated by reference herein, in their entirety and for all purposes.

FIELD

The present application relates to a robotic transport device for small components comprising a transport mechanism for transporting the small components from a first region provided for receiving to a second region provided for storing, comprising a component-receiving unit for picking up individual small components in the first region, for temporarily holding said small components and for storing the small components in the second region, wherein the component-receiving unit is arranged at the transport mechanism and is transported therewith, wherein the transport mechanism is constructed in such a way that it transports the component-receiving unit.

The present application further relates to a method that may be carried out by said robotic transport device.

BACKGROUND

Robotic transport devices for transporting small components are technical devices for transporting and storing bulk material. They are e.g. required in automated manufacturing plants and assembly operations, amongst others in the electronic, automobile and packaging industry. They are also referred to as supply robots or transport robots. In this context, small components may not only have very different shapes and materials, but also have a large variety of dimensions. Most components are in the millimeter range, however, the small components may also be smaller or larger than that.

Originally, this kind of transport was carried out by crane-like robotic transport devices. These simulate all but manual labor picking up an electronic component from a surface and carrying it to a different location where it is stored for further processing. An automatic transport device e.g. implements this by a robot arm which picks up the electronic component by a gripper and places it at the desired location.

In this context, it may be problematic that not every electronic component to be transported can be found at the same starting location. It is true that for preparing the transport, the electronic components are frequently spread out onto a surface so that an electronic component may respectively be gripped; however, due to the spreading out on the surface each individual electronic component is then located at a slightly different location which may in x and y direction differ slightly from the ideal location for gripping or, respectively, receiving.

In practice, so-called vibrating spiral feed bowls or a flexible component conveying surface combined with an image-processing system and an industrial robot are frequently used. In this context, the small components to be transported are at first singularized in an unsorted manner on a horizontal surface, detected by the visual component-detection system or, respectively, the image-processing system and eventually picked up by the industrial robot. The singularized small components are subsequently transported via a predetermined distance, placed at the target location and forwarded for further processing. An example for such a construction is e.g. disclosed in EP 916 457 A2 or, respectively, in U.S. Pat. No. 6,056,108 A.

An essential disadvantage of conventional concepts is that due to the separate handling of the individual small components and the comparatively long travelling paths of the robot arm between gripping the component on the receiving surface and releasing the component at the location of feed, the cycle time is relatively high which may render the procedure carried out annoyingly slow. Existing robot-based supply systems are thus flexible in use when compared to vibrating spiral feed bowls, but relatively slow. The object is thus to carry out measures relating to robot geometry. This is cost-intensive and furthermore limits other possibilities.

Other types of transport of similar small components provide a transport mechanism with linear movements as e.g. described U.S. Pat. No. 6,688,451 B2. Instead of a flexible robot arm, a construction remotely reminiscent of a cable car is used forming an oblong oval. An endless haul track or chain forming the oval itself is placed around two deflection pulleys at the end of the oval, the deflection pulleys also serving as drive discs. By this haul track, grippers are guided that grip the electronic components at the receiving location and store them at the target or storing location in a predetermined manner, the path from the receiving location to the target or storing location being formed by one of the two longitudinal sides of the oval while the other longitudinal side of the transport mechanism is used to return the gripper for re-use.

At this point, the problem occurs that the receiving location and the storing location have to be found very accurately so that the gripping elements may each grip and release the small components at the corresponding locations.

This problem has already been recognized. U.S. Pat. No. 7,712,598 B1 proposes to configure the individual gripping devices in a moveable manner so that the receiving and release procedures may be carried out in a more varied manner. In this context, it is furthermore described that such a transport system may also be suspended at a SCARA robot arm. Such a technical concept, however, is not precise enough for many applications. A further problem is that they describe technical concept requires special components and may not be put into practice by standard components of automation that are freely available and thus inexpensive.

A demand still exists for robotic transport devices for small components that comprise even more possibilities and may fulfill certain aspects of the occurring problems in a better and more flexible manner than the already known robotic transport devices.

Accordingly, a demand exists for methods for carrying out such transports.

SUMMARY

The present application provides a generic robotic transport device that meets further or other demands arising from the issues with supplying small components to other method steps. The present application further provides a corresponding method.

EXAMPLES

According to one aspect, a transport mechanism is suspended at two suspension elements, by distancing the two suspension elements from each other in the direction of transport and by constructing the two suspension elements in such a way that each of them may, independently from each other, be shifted in a direction vertical or virtually vertical to the direction of transport.

According to a further aspect, the transport mechanism is doubly suspended at suspension elements placed at a distance from each other, in that a shift of the two suspension elements of the transport mechanism is carried out independently from each other in a direction vertical or virtually vertical to the direction of transport or in the counter direction, and in that the receiving location and the storing location of the component-receiving unit is independently selected in the region provided for receiving and independently therefrom in the second region provided for storing the small components.

In this context, "virtually vertical" means substantially vertical or that the movement is predominantly of a component vertical to the direction of transport. Deviations by a few degrees are possible depending on the embodiment. The deviation may be up to 45°, however, is preferably less than 10°, particularly less than 5°.

This also applies in the following when mention is made of "virtually vertical to the direction of transport".

By such a concept, technically functional kinematics may be configured. Such technically functional kinematics may be flexibly programmed by a corresponding IT system so that a robotically controlled system results.

By such a robotic transport device it is possible to always create a direct and at the same time linear transport of small components such as electronic components from one region which receives small components to another region in which small components are stored for other fields of application.

In this manner, a transport of parts or components of essentially any desired geometry, material and properties to any desired storing location in the area of the second region provided for storing is made possible.

Unsorted components in a first region may be picked up by gripping elements or pneumatic suction devices or magnets or other component-receiving units. Said component-receiving units will preferably slightly lift the components in a z direction in order to lift them off the surface on which they are placed.

Alternatively, the transport mechanism including the component-receiving unit fastened to it may be lifted off and lowered in a z direction. Lifting-off may be carried out in front of as well as behind the suspension elements.

Herein as well as in the introduction and in the following, the "x direction" is understood to be the direction in which the small components are linearly transported from the receiving location to the storing location. Consequently, the y direction means the direction vertical or virtually vertical to the x direction, however, in the horizontal plane. Hence, the z direction is the vertical direction, i.e. vertical to the horizontal plane that is spanned by the x and the y direction. In practice it may occur that a ramp needs to be taken into account in the x-y plane. The plane can also be a slightly angled inclined plane in order to take special cases into account.

In principle, the transport device might also operate on inclined planes and in coordinates other than these rather strictly structured ones if, for example, entirely different kinds of small components are to be transported, in the transport of which gravity is used or utilized in any kind of way. In this case, the technical features described with reference to the following parameters are to be adapted to the specific constellation.

The component-receiving units now hold the small components in the described concept during transport in the x direction of transport to a second region.

Said component-receiving units may not only be gripping elements or pneumatic suction elements, but may also operate on the basis of magnetic force or have a more complex design. In particular, they may be have a multiaxial drive mechanism or a moveable design. Thus, in some embodiments they may comprise additional axes which in most embodiments may be described as robot axes. By a movement around these axes, an embodiment may for instance cause an additional lifting and lowering of the gripper in a z direction, furthermore or alternatively allow for an angle-dependent alignment or rotation, or pivot or flip the components if such a different arrangement of the small components is desired in the second region in which further processing of the small components is to be carried out such as mounting on a circuit board or incorporating into a larger component of an electronic product or another machine.

The component-receiving units may also be of a slide-type.

It is preferably provided that the transport mechanism is equipped with a plurality of component-receiving units which in a subsequent manner pick up small components from the first region and are one after the after moved alongside the transport direction to the second region.

In practice, it may furthermore be desired that the transport mechanism is equipped with a plurality of component-receiving units distanced from each other.

As an alternative, however, it is also possible that two or more component-receiving units are arranged on top of each other and/or side-by-side in the z direction and are moved with the transport mechanism.

By providing a plurality of component-receiving units at the transport mechanism, the number of transported small components per unit of time may correspondingly be significantly increased. At the same time, the uniformity of the transport is thereby increased and may be controlled.

A particularly easy and simply comprehensible embodiment would be an robotic transport device by which rotationally symmetric components may be transported from a first region to a second region without problems. In this case, a linearly operating axis of a transport mechanism for transporting the small components in the x direction and a component-receiving unit are sufficient.

A transport mechanism essentially is arranged in a direction of transport, i.e. in the x direction, is pivoted at two suspension points as a linear axis. Hereby, the two suspension points may be shifted vertically or almost vertically to the direction of transport, i.e. in a y direction.

The result is that the position of the component-receiving unit in the first region provided for receiving is determined completely independently from the current position of the component-receiving units in the second region provided for storing.

This is not possible by only one axis of rotation. This is obvious from the fact that by an independent suspension at two suspension points a free shifting of the transport mechanism in a y direction is possible. In an extreme case, the component-receiving units arranged at the transport mechanism in the first as well as in the second region may thus at the same time be shifted in parallel to each other in the same direction, or even in an exactly antiparallel manner from each other.

Thus, by the two suspension elements a free parallel shift of the transport mechanism with the component-receiving unit is possible in a y direction as well as a rotation of the transport mechanism in a certain angular range.

In this manner, the specific receiving location may easily be achieved for all small components. Thereby, a direct connection is always enabled between entirely arbitrary positions in the first and the second region.

It is preferably provided that one or more drive units are provided for the shifting of the two suspension elements.

In this context, it may be provided that two suspension elements comprise an associated drive at their respective point of suspension. In an embodiment, the component-receiving units obtain a further separate drive. In this context, in an embodiment with a chain-like arrangement of the transport mechanism for each such chain a drive may be provided which in this case simultaneously moves all component-receiving units at this chain. If instead of a chain-like transport mechanism a transport mechanism of the linear-axis type is selected, which may be desirable in another embodiment, each of said transport mechanisms gets its own drive which, too, is independent from the two suspension points.

Apart from some types of transport mechanisms, a transport mechanism may be chosen in which a non-linear movement results on a partial section in the area between the two regions. Thereby, embodiments with a kind of bend in the direction of transport in horizontal as well as angled direction may be realized. The bend may also be arranged outside of the center.

Various variants and modifications are possible in order to convey additional properties to the robotic transport device.

Hence, it is possible to connect a plurality of individual transport mechanisms to result in a robotic transport device in which a plurality of linear transport mechanisms with two suspension elements each are suspended in parallel to each other. In this case, said parallelly arranged transport mechanisms are equipped with each one or a plurality of component-receiving units, e.g. slides. In this manner, a simultaneous transport of a plurality of small components may be achieved and the haul capacity of a supply robot may be multiplied.

Such an embodiment makes sense for such applications in which a simultaneous arrival of a plurality of small components is advantageous in further processing.

As an alternative, it is possible in an embodiment to connect a plurality of individual transport mechanisms to result in a larger robotic transport device in which the plurality of linear transport mechanisms comprising two suspension elements are arranged serially, i.e. one after the other. In this context, the transport mechanisms arranged in series are each equipped with one or a plurality of component-receiving units, e.g. with slides. Thereby, a complex orientation or placing of the small components may be achieved with at a high speed and with high precision, thus improving the haul capacity of a supply robot.

The component-receiving units may have very different configurations. Thus, with one embodiment e.g. palletizing, even with a rotary alignment, may be achieved. In this context, the component-receiving units are designed in such a way that they pick up the small components from the upper edge of the receiving location in the first region with a corresponding clockwise rotation and store them in the second region at the lower edge of the storing location after transport. Likewise, it is of course possible to provide a corresponding counter-clockwise rotation. In this manner, a rotation of the components becomes possible to a certain degree without configuring the component-receiving units in a rotatable manner. This may result in a slightly reduced clock time since a slightly longer arm movement is desired. Such rotational movements, however, are desirable for certain small components and in this way made possible by additional coordination in a control unit, e.g. by a software control.

In principle, the robotic transport device may also be used for supplying small components on call, e.g. from the target or the storing location, respectively. In preferred embodiments, however, a continuous operation of the component-receiving units at the transport mechanism is carried out in the robotic transport device. Circling grippers or other component-receiving units operate analogously to a transport belt or, as mentioned in the introduction, to a cable car in a flowing motion and a consecutive order. It is true that in such an arrangement the small components are picked up one after the other; however, they are conveyed at the same time at an always constant distance by a transport mechanism.

In principle, a transport mechanism composed of a plurality of carriages may be used instead of a transport belt and in this manner, in turn, a linear movement may be carried out by which a reversion results in both regions, respectively, and in this manner a continuously repeated linear movement is caused. Also conceivable is a parallel utilization of a plurality of linear axes which are each equipped with one or, alternatively, with a plurality of component-receiving units, being carriages, as the case may be.

Application cases exist in which a storage of the small components at the storing location with a consistent time interval are preferred or desired. Said small components should moreover not arrive at the storing location at an irregular distance or in an undesired accumulation.

For this purpose, a buffer area may be implemented in an embodiment. The small components are buffered between the first and the second region during their transport on the transport mechanism. This may e.g. be realized by means of an individual control of each carriage or, respectively, in each component-receiving unit.

Alternatively, a system having a "slipping" conveyor belt is possible in which the subsequent small components each wait for their predecessor to be processed and move forward only after said predecessor is transported away.

In this manner, the point in time of receiving and storing the small components may be controlled independently from each other and the use of the robotic transport devices is enabled in clocked automation facilities, as well.

BRIEF DESCRIPTION OF THE DRAWINGS

The invention will be explained in more detail below with reference to figures, in which, in each case in a schematic illustration.

DETAILED DESCRIPTION

Figure 1:
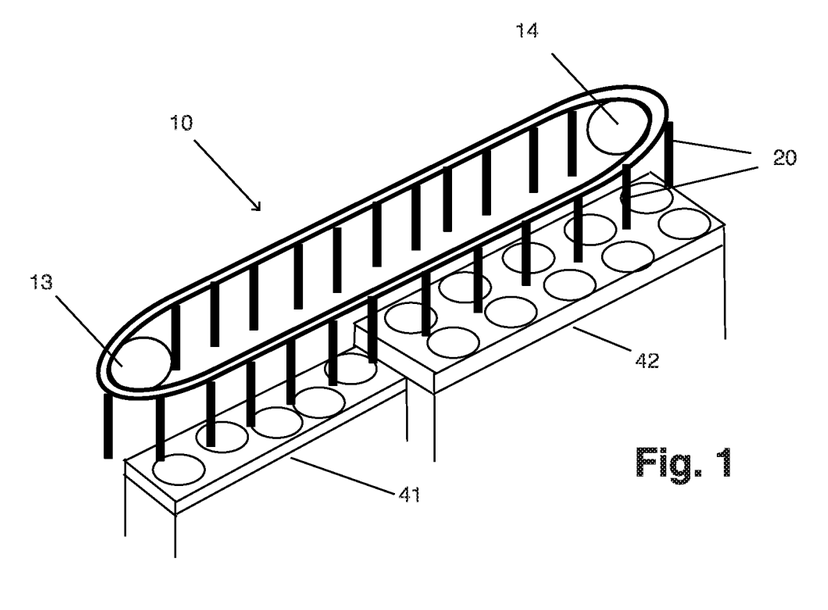
FIG. 1 is a perspective view of a robotic transport device for small components.

A robotic transport device shown in FIG. 1 particularly comprises a transport mechanism 10. The transport mechanism 10 of the shown embodiment has a transport-belt-type design and is reminiscent of a cable car. The transport mechanism 10 thus has an approximately oval shape that comprises two elongated ribbon-shaped sections between two deflection pulleys 13 and 14. Said ribbon-shaped sections of the transport mechanism 10 run in a direction of transport X. Due to the fact that the transport mechanism 10 in the shown embodiment is circular, when the deflection pulleys 13 and 14 are turned one side of the belt of the transport mechanism 10 is moved from bottom left to top right in FIG. 1 and the other side in the counter direction.

The robotic transport device comprising the transport mechanism 10 might conceivably be significantly longer, i.e. with a longer longitudinal extension of the ribbon-shaped sections running in the x direction.

At the transport mechanism 10, component-receiving units 20 are arranged. These are schematically shown in FIG. 1 as suspended rod-like elements. If the belt of the transport mechanism 10 circles, the component-receiving units 20 each circle, as well.

The component-receiving units 20 may e.g. comprise grippers, suction cups, magnets or similar elements or have a slide design.

The component-receiving units 20 serve to pick up small components 30. Said process occurs in the first region 41 provided for receiving small components 30. After picking up the small components 30, the component-receiving units 20 hold the small components 30 and in this manner transport them to a second region 42 by means of the moving transport mechanism 10. This region 42 serves to store the small components 30.

The small components to be received in the first region 41 are e.g. electronic components that are spread on a pad so that the component-receiving units 20 may each pick up one of these small components 30.

After transporting via the transport mechanism 10, they are stored in the second region 42 in a sorted manner.

A control unit is connected to one drive unit or to a plurality of drive units for the transport mechanism 10 and thus influences the circling speed or the transport speed of the transport mechanism 10, respectively, and thus of the component-receiving units 20 arranged thereat and can also switch the transport mechanism 10 on or off, as the case may be, if a transport is to take place or is no longer desired.

Figure 2:
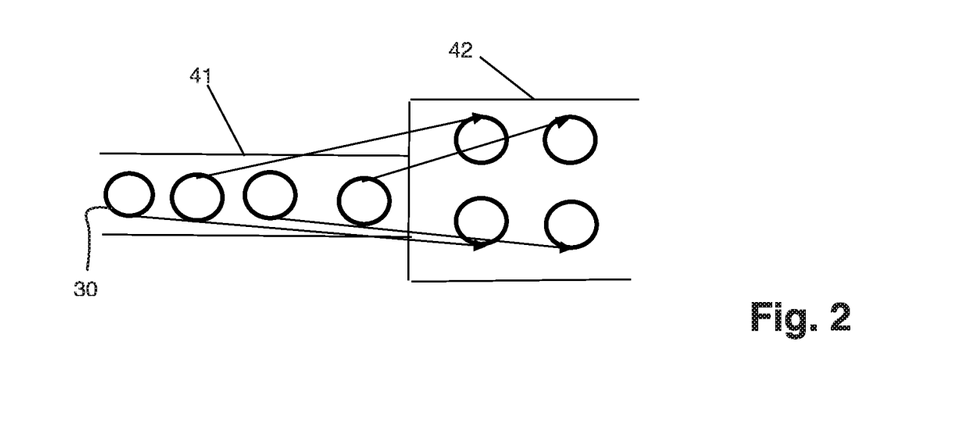
FIG. 2 is a schematic top view of a problem situation during the transport of small components by means of a robotic transport device.

FIG. 2 shows an additional problem situation that cannot be solved in the prior art or can only be solved with extensive time, effort and preparation.

The Figure shows unsorted small components 30 in the first region 41 on the left-hand side and locations on the right-hand side in which the small components 30 are to be stored in the second region. Here, a specific location is provided for each small component 30. An easily conceivable scenario are e.g. electronic components supplied for integration in a chip and of course having to be delivered to specific locations in the second region 42 in the area of the chip.

Figure 3:
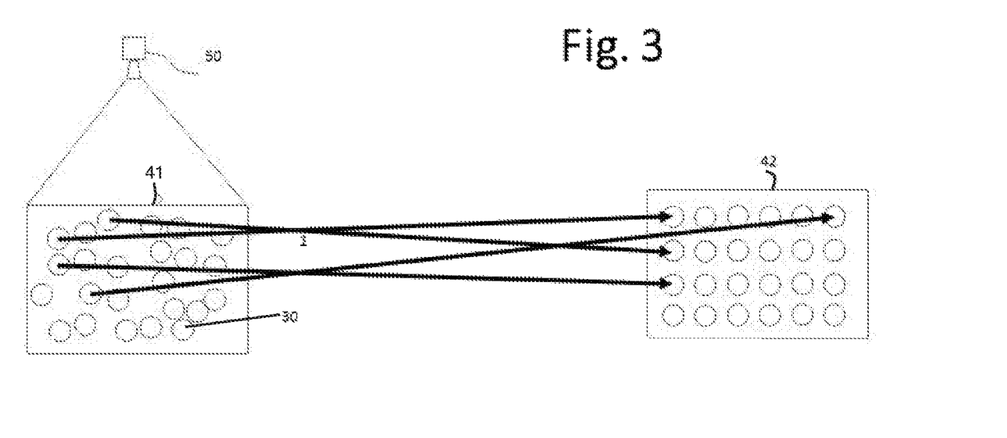
FIG. 3 is a schematic top view of an extended problem situation during transport of small components by means of a robotic transport device.

FIG. 3 shows a problem situation (similar to FIG. 2). In the first region 41, a total of twenty-four small components 30 can be seen on a pad in an unsorted manner. Said twenty-four small components are now to be distributed to twenty-four positions in the second region 42. A specific order is provided there. In this context, it has to be taken into account that the small components do not have to be identical to each other but can have varying configurations.

FIG. 2 additionally shows that the distance between the first region 41 and the second region 42 may be quite significant and has to be overcome by a transport mechanism 10.

It is schematically shown that in this embodiment comprising a component-detecting system 50 and a control unit, the component-receiving units 20 are controlled in such a way that they detect a small component 30, pick it up and store it at the correct location. The component-detecting system 50 may comprise a camera and an image-recognition software. Such component-detection systems 50 are currently frequently used for similar purposes in industrial manufacturing processes. The component-detection system 50 may identify one small component 30 or a plurality of small components 30 prior to receiving in the region 41 as well as provide via the control unit that the component-receiving unit 20 actually picks up exactly this small component 30, holds it and stores it after reaching the target location.

Even the component-detection system 50 may influence the transport speed or the start or stop of the movement of the transport mechanism 10 as it may e.g. detect that no small components 30 are present in the first region 41 for receiving the small components 30 anymore or that in region 42 there are no more locations to be occupied by small components 30 to be stored.

It is conceivable that the component-detection system 50 recognizes which small component is located where and where it has to be conveyed to; the transport mechanism 10 of the transport device may reach all locations mechanically. Conventional so-called pick-and-place robots may fulfil this task only slowly and with a limited precision due to the physically limited acceleration and speed.

Of course, embodiments without component-detection system are conceivable. This is e.g. the case if the transport device is to be used to re-pallet small components already arranged in a grid dimension to a different grid dimension.

Figure 4:
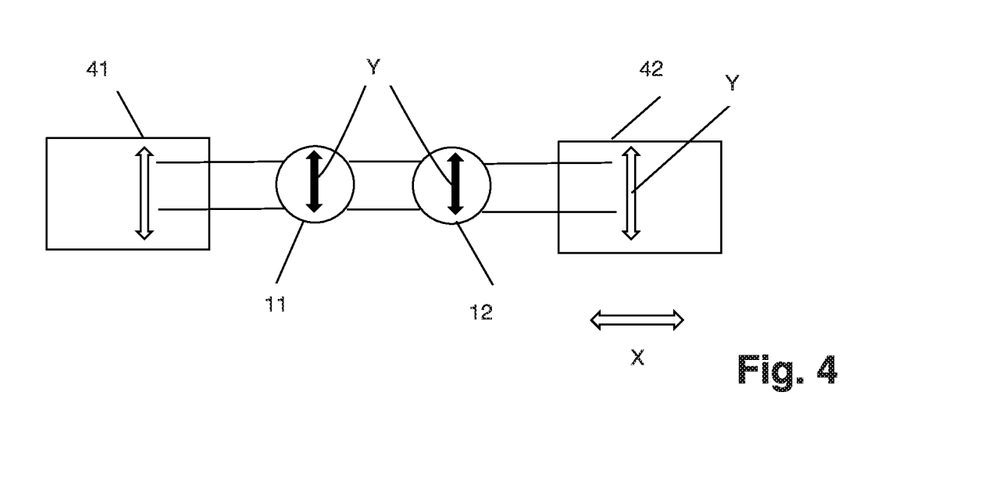
FIG. 4 is a schematic view of the functionality of an robotic transport device.

A robotic transport device e.g. from FIG. 1 is now modified in such a way as it is only schematically shown in FIG. 4. Thereby, it is not necessarily a robotic transport device analogously to FIG. 1; this was only schematically used in order to show and describe a possibility of transporting small components in the manner.

In FIG. 4, in turn, a first region 41 can be seen on the left side and a second region 42 on the right side. Between these two regions, a robotic transport device is once more depicted of which merely the concept of the transport mechanism 10 running in the direction of transport X is shown in a very schematic manner during its course from left to right.

The two deflection pulleys 13 and 14 of FIG. 1 have been omitted herein, particularly because any other concept is applicable.

Figure 5:
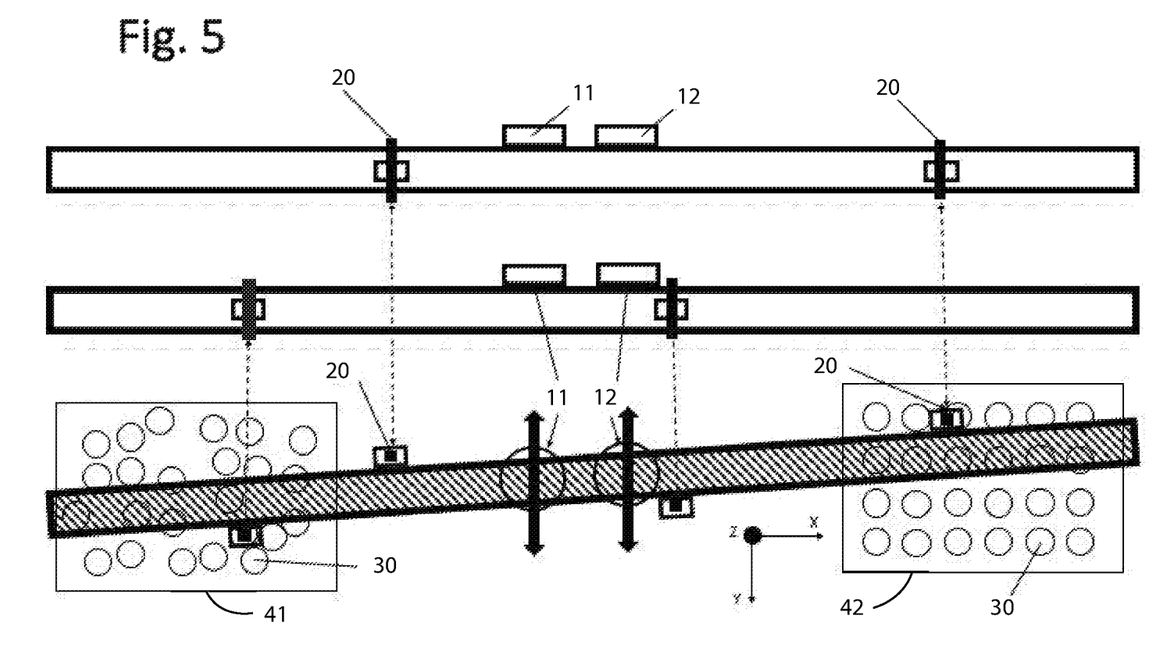
FIG. 5 is a schematic view of an robotic transport device from the right, the left and from the top.

It is the core to suspend the transport mechanism 10 at two suspension elements 11 and 12; these are not shown in FIG. 1, but in FIG. 5.

FIG. 5 shows the architecture and the kinematics of a robotic transport device or, respectively, of a transport device for a robot or, respectively, for a supply robot in greater detail, though schematically.

In this context, the upper area of the depiction shows a view of the robotic transport device in the Y direction, and from the right side relating to the X direction.

Below this, the same embodiment is shown in the Y direction, as well, so that here, too, the X direction is depicted running to the right and the Z direction running upwards. However, the robotic transport device is herein shown in a perspective from the left.

Below this, the robotic transport device is shown from the top, i.e. in the Z direction or opposite to the Z direction.

In a first embodiment, the suspension elements 11 and 12 may be conceived in a crane-like manner or as elements gripping from above, thus engaging below the path of the transport mechanism 10 without preventing its movement in any from. Other suspension principles may be realized herein, as well.

The idea now is to configure these suspension elements 11 and 12 in such a way that they have a distance from each other in the direction of transport, i.e. in the X direction. Moreover, each of the two suspension elements 11, 12 may be shifted in the Y direction independently from each other. This shift may in turn be coordinated by the above-mentioned control unit. A drive unit may be used for said shift. The drive unit is preferably separate from the drive unit(s) used for the drive of the transport mechanism 10 itself.

What is interesting in this context is the resulting effect: if both suspension elements 11, 12 of FIG. 5 are shifted in the Y direction, the entire transport mechanism 10 is shifted in parallel, as well, together with the component-receiving units 20, even those that are currently present in regions 41 and 42. In this manner, even small components 30 may be picked up that are out of the range of the actual target location or the target region, e.g. in region 41 and 42. If this is the case and for which small components 30 this is true may in turn be detected by the component-detection system 50.

The same is true for storing in region 42.

Likewise, by an independent shift of the suspension elements 11 and 12 either the complete transport mechanism 10 may be shifted up and down in the paper plane of FIG. 3 or in the Y direction of FIG. 5, or the direction of transport X is shifted from its erstwhile direction into a slightly angled direction from bottom left to top right or top left to bottom right, with all intermediate values as a possibility.

In this manner, the entire space of regions 41 and 42 may be occupied relatively quickly, simply and reliably without having to manipulate or modify the component-receiving units 20 in a particularly complex, expensive and error-prone way. All modification can be limited to the two suspension elements 11 and 12.

It is easy to realize that component-receiving units 20 may be designed in very different ways; still, the intended purpose may reliably be achieved by such a design comprising two independently shiftable suspension elements.

It is also possible to use a plurality of transport mechanisms 10 in a robotic transport device. This may either be carried out by suspending a plurality of transport mechanism 10 in parallel at the same suspension elements 11 and 12, so that the transport mechanisms 10 each move simultaneously. In the same manner, however, it may be provided in an embodiment to construct all suspension elements 11 and 12 independently for a plurality of transport mechanisms 10.

Figure 6:
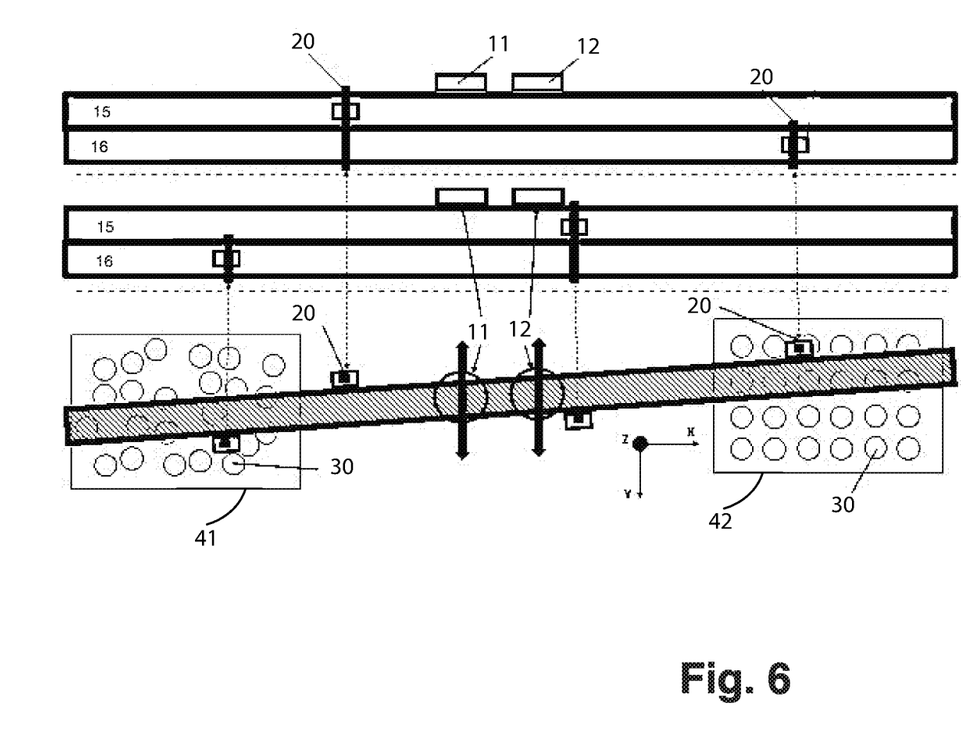
FIG. 6 is a schematic view of a further robotic transport device from the right, the left and from the top.

A possibility for such a design is shown in FIG. 6. It is obvious that the view of FIG. 6 is very similar to that of FIG. 5. The view of above depicted as the lowermost shape is practically identical.

The difference is that the transport mechanism 10 is herein subdivided into two partial transport mechanisms which in this case form an upper rail 15 and a lower rail 16. The component-receiving units 20 may then be suspended independently from each other at the two rails 15, 16 or at the two transport mechanisms, respectively. In this embodiment, a kind of slide is indicated as part of a component-receiving unit 20.

The result is a robotic transport device having two levels so that even four component-receiving units may be moved and may travel relative to each other without limitations.

As a precautionary measure only it should be mentioned that the upper component-receiving unit should travel in the Y direction slightly beside or outside of the lower component-receiving unit in order to avoid a collision in the Z direction.

The robotic transport device may be subdivided into two or more parallelly operating robotic partial transport devices. These partial transport devices that may also be referred to as "robots" would then functionally share the two axes with two suspension points or suspension elements 11, 12 each. In this context, each of the robotic partial transport devices may be moved independently from one another.

The purpose of a plurality of transport mechanisms may e.g. be to provide several or a plurality of small components 30 from various regions 41 for the next production step in the manufacturing plant or generally in region 42 at the same time.

Figure 7:
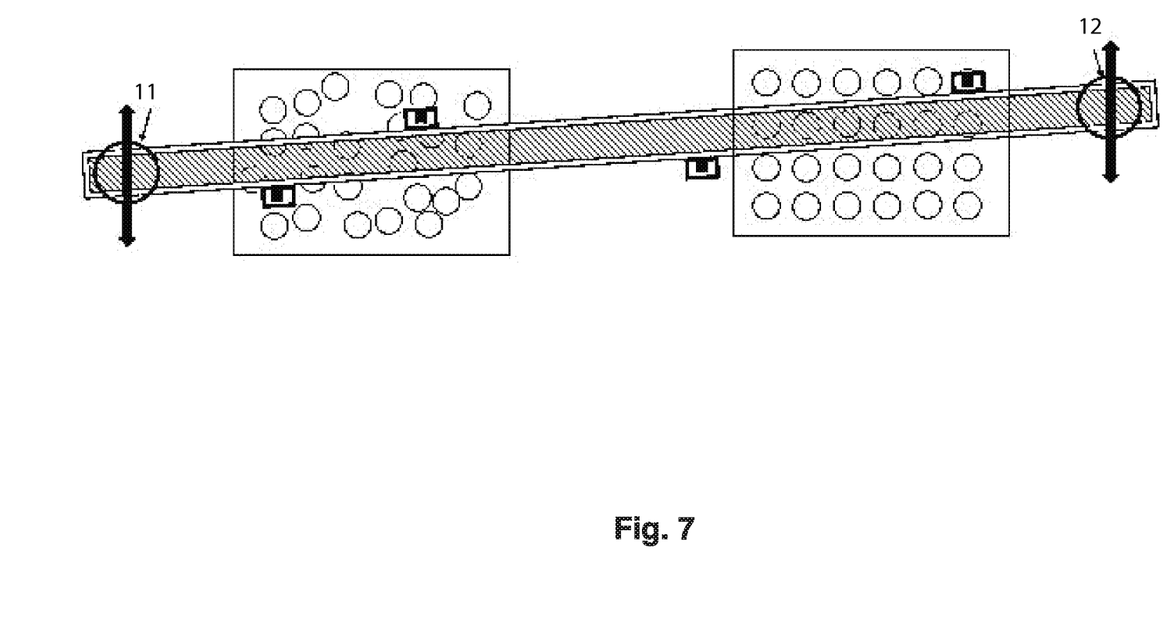
FIG. 7 is a view of an alternative embodiment to the embodiment of FIG. 5 or 6, here as a schematic top view only.

The depiction of FIG. 7 is similar to the top view of FIGS. 5 and 6. It is a top view onto a robotic transport device that is conceivable with a transport mechanism 10 as shown in FIG. 5 or with two transport mechanisms and upper and lower rails 15, 16.

It is obvious that differing from the embodiments of FIGS. 5 and 6, the two suspension elements 11 and 12 are not arranged between the two regions 41 and 42, but outside of said regions. The suspension elements 11 and 12 at which the transport mechanism 10 is suspended are in this arranged outside of the outer regions that may be reached by the component-receiving units 20 for receiving the small components.

The advantage of such an alternative embodiment is that the receiving region 41 and the storing region 42 may be closer together than in the embodiments of FIGS. 5 and 6. The result is that the precision and the repeatability of the transport procedure as a whole may be increased even more by the reduced leverage.

Compared to this embodiment of FIG. 7, the embodiment of FIGS. 5 and 6 has the advantage that the Y axes at the suspension elements 11 and 12 enable travelling over a shorter path. Correspondingly, the method of the embodiment of FIG. 7 takes a bit longer which causes this arrangement to operate a little more slowly.

It should be chosen depending on the type of application which of these embodiments of the robotic transport device is to be used. Both have their advantages to offer.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A robotic transport device for small components, comprising:
a transport mechanism configured for transporting the small components from a first region provided for receiving to a second region provided for storing;
a component-receiving unit configured for receiving individual small components in the first region for temporarily holding said individual small components and for storing the small components in the second region;
wherein the component-receiving unit is arranged at the transport mechanism and is transported therewith;
wherein the transport mechanism is suspended at two suspension elements;
wherein the two suspension elements are distanced from each other in a direction of transport; and
wherein each of the two suspension elements are configured to be shifted independently from each other in a direction perpendicular to the direction of transport.

2. The robotic transport device of claim 1, wherein the transport mechanism is constructed in such a way that it transports the component-receiving unit in a linear manner, except for sections of the transport mechanism adjacent to the first region and/or adjacent to the second region and except for a partial section of the transport mechanism between the regions.

3. The robotic transport device of claim 1, wherein one or a plurality of drive units are provided for shifting the two suspension elements.

4. The robotic transport device of claim 1, wherein the transport mechanism is equipped with a plurality of component-receiving units which consecutively pick up small components from the first region which are one after the other moved to the second region along the transport direction.

5. The robotic transport device of claim 4, wherein the transport mechanism is equipped with a plurality of component-receiving units that are spaced apart from one another.

6. The robotic transport device of claim 1, wherein one or a plurality of drive units are provided for the transport mechanism, and that the drive units drive the transport mechanism in such a way that the component-receiving units are moved from the first region to the second region.

7. The robotic transport device of claim 1, wherein a plurality of transport mechanisms is provided which forwards small components from the same or from different first regions to the second region.

8. The robotic transport device of claim 1, wherein the component-receiving unit includes or is provided with grippers and/or pneumatic suction devices and/or magnetically acting elements and/or slides.

9. The robotic transport device of claim 1, wherein the transport mechanism comprises an endless circular transport system by which one or a plurality of component-receiving units are forwarded from the first region to the second region and, after storing of the small components, back to the first region in a circular continuous movement.

10. The robotic transport device of claim 9, wherein during the continuous movement, the distance between two component-receiving units is kept constant.

11. The robotic transport device of claim 1, wherein a buffer area is implemented on the transport mechanism which is realized by individually addressing each component-receiving unit and/or by a slipping configuration of the transport mechanism in which each component-receiving unit waits for a time-dependent storage of the small component of the preceding component-receiving unit.

12. The robotic transport device of claim 1, wherein the transport mechanism is constructed in such a way that it transports the component-receiving unit in a linear manner, except for sections of the transport mechanism adjacent to the first region and/or adjacent to the second region and except for a possible partial section of the transport mechanism between the regions.

13. The robotic transport device of claim 1, wherein one or a plurality of drive units are provided for shifting the two suspension elements.

14. A method for transporting small components, in which:
small components are transported from a first region provided for receiving to a second region provided for storing by a transport mechanism; and
individual small components are picked up by a component-receiving unit in the first region, then temporarily held and finally stored in the second region;
wherein a transport of the component-receiving unit is carried out by the transport mechanism;
wherein the transport mechanism is doubly suspended at suspension elements arranged at a distance from each other; and
wherein a shift of the two suspension elements of the transport mechanism is carried out independently from each other in a direction perpendicular or almost perpendicular to the direction of transport or in the counter-direction.

15. The method of claim 14, wherein the receiving location and the storing location of the component-receiving unit are independently selected in the region provided for receiving the small components and, independently therefrom, in the second region provided for storing.

16. The method of claim 14, wherein the component-receiving unit is transported linearly by the transport mechanism.

17. The method of claim 14, further comprising deviating from the linear transport, wherein the deviating comprises a non-linear transport takes place on sections of the transport path adjacent to the first region and/or adjacent to the second region, and/or on partial sections between the regions.

18. The method of claim 14, wherein the entire transport mechanism suspended at the two suspension elements and/or the component-receiving unit(s) are moved into a vertical direction.

19. A robotic transport device for small components comprising:
a transport mechanism being suspended at two suspension elements; and
a component-receiving unit being configured for receiving the components in a first region, for temporarily holding the components and for storing the components in a second region;
wherein the component-receiving unit is arranged at the transport mechanism, the transport mechanism being configured for transporting the components from the first region to the second region, and the first region and the second region each being spanned by an x direction and a y direction;
wherein the two suspension elements are distanced from each other in a direction of transport;
wherein the two suspension elements are constructed such that each suspension element is, independently from each other, configured to be shifted in a direction substantially vertical to the direction of transport;
wherein the x direction is the direction of transport; and
wherein the y direction is the direction to be shifted.

20. The robotic transport device of claim 19, wherein the two suspension elements are constructed such that each is independently configured to be shifted in a direction deviating by up to 45 degrees from vertical, deviating by less than 10 degrees from vertical, or deviating by less than 5 degrees from vertical.

* * * * *